(12) United States Patent
Roessler et al.

(10) Patent No.: US 7,181,845 B2
(45) Date of Patent: Feb. 27, 2007

(54) ROLLER WITH INTEGRAL BEARING ASSEMBLY MOUNT AND METHOD FOR MANUFACTURING SAME

(75) Inventors: David A. Roessler, Hartland, WI (US); Anthony J. Stetler, Oconomowoc, WI (US); Frederick H. Thimmel, Hartland, WI (US)

(73) Assignee: Bryant Products, Inc., Ixonia, WI (US)

( * ) Notice: Subject to any disclaimer, the term of this patent is extended or adjusted under 35 U.S.C. 154(b) by 0 days.

(21) Appl. No.: 10/376,471

(22) Filed: Feb. 28, 2003

(65) Prior Publication Data

US 2004/0182674 A1  Sep. 23, 2004

(51) Int. Cl.
*B21K 1/02* (2006.01)

(52) U.S. Cl. ...................... 29/895.33; 29/895.3; 29/895

(58) Field of Classification Search ............... 29/895.3, 29/895.2, 895.21, 895.22
See application file for complete search history.

(56) References Cited

U.S. PATENT DOCUMENTS

| | | | |
|---|---|---|---|
| 374,703 | A | 12/1887 | Ritchie |
| 1,611,176 | A | 12/1926 | Fekete |
| 1,712,118 | A | 5/1929 | Powers |
| 1,983,845 | A | 12/1934 | Evenburgh |
| 2,162,327 | A | 6/1939 | Dewey et al. |
| 2,188,953 | A | 2/1940 | Mitchell |
| 2,265,723 | A | 12/1941 | Dewey et al. |
| 2,284,377 | A | 5/1942 | Dewey et al. |
| 2,407,499 | A | 9/1946 | Klossner |
| 2,559,360 | A | 7/1951 | Kurzweil |
| 2,711,299 | A | 6/1955 | Dugle |
| 2,730,222 | A | 1/1956 | Klein |
| 3,019,678 | A | 2/1962 | Fiell |
| 3,029,767 | A | 4/1962 | Donnan |
| 3,118,315 | A | 1/1964 | Loosli |
| 3,122,945 | A | 3/1964 | Chung |
| 3,422,692 | A | 1/1969 | Woodring |
| 3,495,796 | A | 2/1970 | Fruh |
| 3,520,182 | A | 7/1970 | Kelk |
| 3,632,273 | A | 1/1972 | Savickas |
| 3,737,287 | A | 6/1973 | Churchill et al. |
| 3,832,910 | A | 9/1974 | Bryant |

(Continued)

FOREIGN PATENT DOCUMENTS

JP        2000-50364        2/2000

*Primary Examiner*—Khoi H. Tran
(74) *Attorney, Agent, or Firm*—Jansson, Shupe, Munger & Antaramian, Ltd.

(57) ABSTRACT

An improved conveyor roller (100) having a belt-engagement length (103) between a first end (101) and second end (102), and a necked-down portion (109) adjacent the second end, and a method of manufacturing such a roller are disclosed. The method comprises forming a roller from a metal tube (12) with a longitudinal axis (106), first and second ends, and an initial outer diameter by: rotating the tube about the longitudinal axis, the tube being substantially free of internal and external supports between the ends thereof, providing rollers (40,41) which are rotatable about corresponding axes generally parallel to the longitudinal axis; and urging the rollers against the tube and moving the rollers between the ends of the tube so as to alter the outer diameter of the tube to form the belt-engagement length and the necked-down portion, the necked-down portion providing a mounting surface for receiving a bearing assembly.

10 Claims, 7 Drawing Sheets

U.S. PATENT DOCUMENTS

| | | |
|---|---|---|
| 3,874,208 A | 4/1975 | Werner |
| 3,921,793 A | 11/1975 | Huchinson et al. |
| 3,942,338 A | 3/1976 | Furlette et al. |
| 3,949,805 A | 4/1976 | Hazelett et al. |
| 3,993,185 A | 11/1976 | Fleckenstein et al. |
| 4,007,827 A | 2/1977 | Mattos |
| 4,034,837 A | 7/1977 | Vinaresik et al. |
| 4,036,044 A | 7/1977 | Yoshimura |
| 4,038,850 A | 8/1977 | Sakagami |
| 4,041,990 A | 8/1977 | Tang et al. |
| 4,047,413 A | 9/1977 | Lewis et al. |
| 4,169,530 A | 10/1979 | Fryatt |
| 4,508,213 A | 4/1985 | Kelley |
| 4,544,061 A | 10/1985 | Crandall |
| 4,583,961 A | 4/1986 | Kawasawa et al. |
| 4,792,168 A | 12/1988 | Kardosh |
| 4,803,804 A | 2/1989 | Bryant |
| 4,820,283 A | 4/1989 | Schickling et al. |
| 4,920,627 A | 5/1990 | Aikins et al. |
| 4,953,376 A | 9/1990 | Merlone |
| 5,025,916 A | 6/1991 | Kaminski |
| 5,030,173 A | 7/1991 | Bryant |
| 5,048,661 A | 9/1991 | Toye |
| 5,054,608 A | 10/1991 | Bryant |
| 5,119,924 A | 6/1992 | Kaminski |
| 5,125,251 A | 6/1992 | Pettersson et al. |
| 5,170,547 A | 12/1992 | Nikulainen et al. |
| 5,259,821 A | 11/1993 | Bryant |
| 5,282,532 A | 2/1994 | Thomas, Sr. |
| 5,449,063 A | 9/1995 | Thomas, Sr. |
| 5,452,791 A | 9/1995 | Morency et al. |
| 5,501,235 A | 3/1996 | Watanabe |
| 5,547,448 A | 8/1996 | Robertson |
| 5,875,878 A * | 3/1999 | Pierson ..................... 193/37 |
| 5,927,479 A | 7/1999 | Merten et al. |
| 6,000,531 A | 12/1999 | Martin |
| D423,178 S * | 4/2000 | Specht ..................... D34/29 |
| 6,076,820 A | 6/2000 | Nagai et al. |
| 6,082,528 A | 7/2000 | Habberley |
| 6,202,557 B1 | 3/2001 | Kustermann |
| 6,209,702 B1 * | 4/2001 | Agnoff ..................... 193/37 |
| 6,233,991 B1 | 5/2001 | Thimmel et al. |
| 6,782,996 B1 * | 8/2004 | Wolf ..................... 198/781.02 |

* cited by examiner

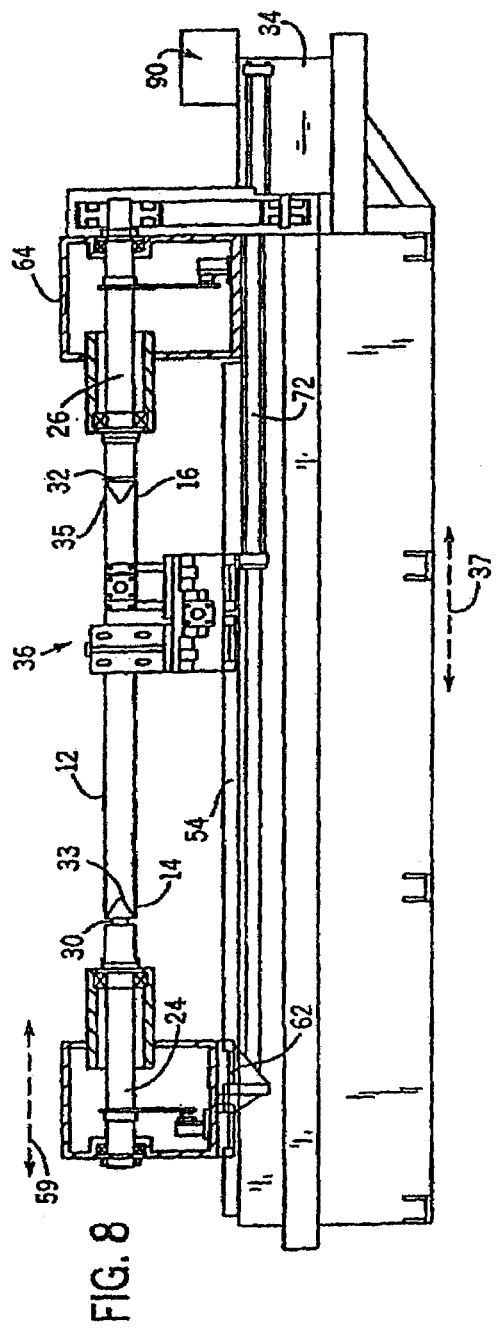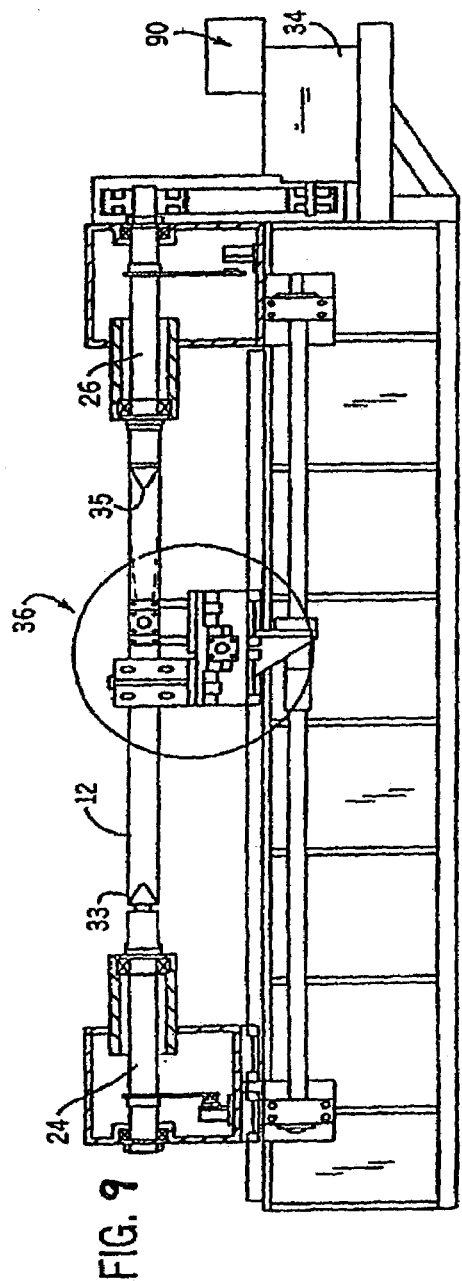

ROLLER WITH INTEGRAL BEARING ASSEMBLY MOUNT AND METHOD FOR MANUFACTURING SAME

FIELD OF THE INVENTION

This invention relates generally to the field of forming rollers and, more specifically, to the forming of tapered rollers (such as conveyor rollers, drum pulleys, web feed rollers, conveyor belt troughing idlers, conveyor belt troughing rollers) with mounts for receiving bearing assemblies.

BACKGROUND OF THE INVENTION

Tapered rollers are used for a wide variety of purposes. Simply by way of example, conveyor systems for moving finished and unfinished products to various locations in facilities such as factories and distribution warehouses often use endless moving flexible belts and/or sequences of rollers, and such conveyor systems typically include tapered rollers to form turns and spiral sections of conveying paths. Another related use for tapered rollers includes web feed rollers used in the production and/or processing of paper or plastic films. Still another is for conveyor drum pulleys used at the ends of belt conveyors; conveyor drum pulleys include outer drums, side panels, and hub assemblies of various constructions that either accept shafts or have shafts welded thereto. The drum face of a pulley can be straight, or can be point crowned, trapezoidally crowned, arc crowned or machined to special shapes; in some cases grooving is included for belt tracking strips.

Support bearing assemblies are typically inserted in the hollow ends of rollers and fitted against the inner surface of the roller to provide for rotatable attachment of the roller to an axle or other support along the opposite sides of the conveyor path. For rollers having small diameter ends, small support bearing assemblies can be fitted directly into the end. While large support bearing assemblies could be fitted into large diameter ends of rollers, such large support bearing assemblies are prohibitively expensive. Therefore, large diameter ends are typically first fitted with a washer before a small support bearing assembly is mounted to the inner surface of the washer. For tapered rollers, the washer is typically selected such that the inner diameter is equal to the inner diameter of the opposite small-diameter roller end.

There are several problems associated with the use of washers to mount small support bearing assemblies to large-diameter rollers. First, the washer provides for connection between the support bearing assembly and roller only along the thin outer and inner diameters of the washer. Such a small connection point is vulnerable to separating or otherwise breaking. Second, the fitting of washers to a roller requires additional manufacturing steps including placing the washer in position and welding it in place. Third, welding washers to rollers adds more inaccuracy to the geometry of the roller since washers must be perfectly dimensioned and arranged within the roller to provide for correct alignment. Typically, the washer must be reamed after being fitted in the roller to ensure proper alignment. Fourth, because welding requires use of unplated rollers, the additional difficulty of plating the finished roller and washer is added when using washers. Fifth, use of washers to provide a mount for support bearing assemblies adds weight to the roller.

To summarize, the prior art use of washers to mount support bearing assemblies to rollers increases supply costs, manufacturing costs, and the time required to manufacture a finished roller having at least one large-diameter end with such a mount. With these things in mind, there is a clear need in the industry for more readily produced rollers with large-diameter ends suitable for use with small support bearing assemblies. In addition, there is a clear need for higher quality rollers with large-diameter ends suitable for industrial use with small support bearing assemblies. More generally, there is a clear need in the field of forming large-diameter metal rollers for improved rollers and methods of manufacturing such rollers.

OBJECTS OF THE INVENTION

A primary object of the present invention to provide a roller with improved mounts for receiving support bearing assemblies.

Another object of this invention is to provide an improved roller and method for manufacturing rollers which overcomes shortcomings and problems of the prior art, including those referred to above.

Another object of the invention is to provide an improved roller with integral mounting surfaces for receiving support bearing assemblies.

Another object of the invention is to provide an improved roller with an extended surface for providing a large connection point between the roller and support bearing assemblies.

Another object of the invention is to provide an improved method for manufacturing rollers with large diameters and mounting surfaces for receiving support bearing assemblies.

Another object of the invention is to provide an improved tapered roller having integral mounting surfaces at each end for receiving same-size support bearing assemblies.

Another object of the invention is to provide a one-step manufacturing method which results in tapered rollers with integral mounting surfaces for receiving small support bearing assemblies.

Another object of this invention is to provide an improved spin-forming method for manufacturing tapered rollers with necked-down portions which greatly simplifies the preparation of rollers for use with conveyors.

These and other objects of the invention will be apparent from the disclosure and discussion herein.

BRIEF SUMMARY OF THE INVENTION

In accordance with the present invention, an improved method of manufacturing a tapered conveyor roller is provided. The manufactured tapered conveyor roller includes a belt-engagement length tapered from a smaller-diameters portion near a first end to a larger-diameters portion near a second end and is formed from a metal tube with a longitudinal axis, first and second ends, and an initial outer diameter. The improved method includes: rotating the tube about the longitudinal axis, the tube being substantially free of internal and external supports between the ends thereof; providing first and second rollers preferably having outer surfaces free of recesses and which are rotatable about corresponding axes generally parallel to the longitudinal axis; urging the rollers against the tube, preferably with a predetermined force, and moving the rollers between the first and second ends of the tube so as to alter the outer diameter of the tube to form (a) the smaller- and larger-diameters portions along the belt-engagement length and (b) a necked-down portion adjacent the second end. To provide for use with a conveyor, the method preferably further includes the step of securing a bearing assembly directly to the necked-down portion.

In certain preferred embodiments, the method further includes the steps of: providing first and second spaced clamp assemblies and supporting each end of the tube with a corresponding clamp assembly. In such a preferred embodiment, the method further includes the step of urging the clamp assemblies toward each other so as to capture the tube therebetween. Such method may also include the step of allowing at least one of the clamp assemblies to move freely away from the other clamp assembly to accommodate any increase in length of the tube in response to the altering of the outer diameter of the tube.

In another preferred embodiment, the method may include the step of varying the predetermined force of the first and second rollers against the tube as the first and second rollers are moved between the first and second ends of the tube.

The invention can also be described as a method of manufacturing a conveyor roller with a belt-engagement length between first and second ends from a metal tube with a longitudinal axis, first and second ends, and an initial outer diameter. Such a method includes: rotating the tube about the longitudinal axis, the tube being substantially free of internal and external supports between the ends thereof; providing first and second rollers which are rotatable about corresponding axes generally parallel to the longitudinal axis; and urging the first and second rollers against the tube and moving the first and second rollers between the first and second ends of the tube so as to alter the outer diameter of the tube to form (a) the belt-engagement length and (b) a necked-down portion adjacent at least one of the ends, the necked-down portion being sized to provide for connection to a support bearing assembly. In certain embodiments, such a method may also include securing a bearing assembly directly to the necked-down portion.

In accordance with the present invention, an improved tapered conveyor roller is also provided. Such a tapered conveyor roller comprises: first and second ends; a belt-engagement length tapered from a smaller-diameters portion near the first end to a larger-diameters portion near the second end; and a necked-down portion adjacent the second end.

It is preferred that the roller be formed by providing a metal tube with a longitudinal axis, first and second ends, and an initial outer diameter; rotating the tube about the longitudinal axis, the tube being substantially free of internal and external supports between the ends thereof; providing first and second rollers which are rotatable about corresponding axes generally parallel to the longitudinal axis; urging the first and second rollers against the tube and moving the first and second rollers between the first and second ends of the tube so as to alter the outer diameter of the tube to form (a) the smaller- and larger-diameters portions along the belt-engagement length and (b) the necked-down portion adjacent the second end of the roller.

In a preferred conveyor roller, the first and second ends, belt-engagement length, smaller-diameters portion, larger-diameters portion, and necked-down portion are integral.

In another preferred conveyor roller, the first end has a first inner diameter, the second end has a second inner diameter and the first and second inner diameters are substantially equal. For other preferred conveyer rollers, it is preferred that the necked-down portion have a necked-down inner diameter, the first end have a first inner diameter and the necked-down and first inner diameters be substantially equal.

In certain preferred embodiments, a necked-down portion may be adjacent each of the ends such that a first necked-down portion is adjacent the first end and a second necked-down portion is adjacent the second end. In such an embodiment, it is preferred that the first necked-down portion have a first necked-down inner diameter, the second necked-down portion have a second necked-down inner diameter and the necked-down inner diameters be substantially equal.

The invention also includes apparatus for spin-forming a tube into a roller including a necked-down portion. The tube extends along a longitudinal axis and has first and second ends and an initial outer diameter. Operation of the improved apparatus produces tapered rollers of various kinds, including but not limited to those referred to above, from cylindrical tubes.

The apparatus for manufacturing this invention includes a first clamp assembly for removably supporting the first end of the tube and a second clamp assembly axially spaced from the first clamp assembly for removably supporting the second end of the tube. A rotation structure is operatively connected to at least one of the clamp assemblies for rotating the tube about the longitudinal axis. A pair of rollers are positioned on opposite sides of the tube for engaging the tube. Such rollers are rotatable about corresponding axes which are generally parallel to the longitudinal axis, and each roller is movable between a first position adjacent to the first clamp assembly and a second position adjacent to the second clamp assembly. A controller urges the outer surfaces of the rollers against the tube with a predetermined force and controls the movement of the rollers between the first and second positions as the outer surfaces of the rollers are urged against the tube to alter the outer diameter of the tube.

It is contemplated that the rotation structure be interconnected to the first clamp assembly and that the second clamp assembly be supported on a carriage. The carriage is movable along the longitudinal axis between a first open position in which the tube may be positioned between the clamp assemblies and a second clamping position in which the tube is supported by the clamp assemblies. The carriage is supported on and travels along the first and second rails. The rails are generally parallel to each other and to the longitudinal axis. It is contemplated that at least one of the clamp assemblies be free to move axially away from the other clamp assembly to accommodate any increase in the length of the tube in response to the altering of the outer diameter of the tube. Each clamp assembly includes an end member having a conical configuration for insertion into the corresponding end of the tube. A clamping member urges the clamp assemblies toward each other to capture the tube between the end members.

In accordance with the invention, the method of manufacturing a roller having a necked-down portion is provided. A tube extends along a longitudinal axis and has first and second ends and an initial outer diameter. Significantly, the tube is free of internal and external supports between the first and second ends thereof. First and second rollers are provided which are rotatable about corresponding axes generally parallel to the longitudinal axis. The rollers are urged against the tube with a predetermined force and moved between the first and second ends of the tube to alter the outer diameter of the tube.

Each end of the tube is supported by a corresponding clamp assembly. The clamp assemblies are urged toward each other to capture the tube therebetween. At least one of the clamp assemblies is free to move away from the other clamp assembly to accommodate any increase of length in the tube in response to the altering of the outer diameter of the tube. The force of the rollers engaging tube may vary as the rollers move between the first and second ends of the tube.

Using the unique apparatus and method of this invention, a wide variety of tapered rollers can be produced from a cylindrical tube which during such production is free of any internal or external supports at positions between the first and second clamp assemblies. The apparatus and method of this invention allow quick, convenient and low-cost manufacture of tapered rollers. According to the present invention, spin-forming of tubes into tapered rollers having mounts for bearing assemblies is greatly facilitated and the cost of production is significantly reduced. Furthermore, the need for washers and the associated labor and costs is eliminated.

BRIEF DESCRIPTION OF THE DRAWINGS

The drawings illustrate a preferred embodiment of the invention, including key features and characteristics. In the drawings:

FIG. 8 is a side elevational view, partially in section, of the apparatus of FIG. 6.

FIG. 9 is view similar to that of FIG. 8 but showing the cross slide having moved axially from right to the left along the outer surface of the tube.

DETAILED DESCRIPTION OF PREFERRED EMBODIMENTS

Figure 1:
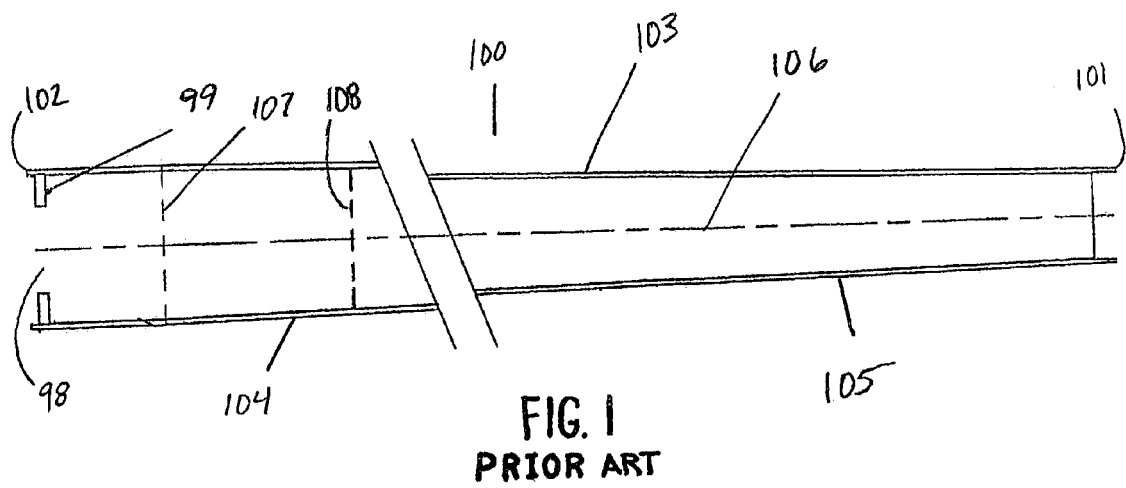
FIG. 1 is a cross-sectional view of a prior art tapered roller having a washer fixed within one end.

FIG. 1 depicts a tapered roller 100 as is known in the prior art. Tapered roller 100 has a belt-engagement length 103 which extends from first end 101 to second end 102 around longitudinal axis 106. Roller 100 is generally hollow and has an outer diameter 107 and inner diameter 108. Such diameters vary from first end 101 to second end 102 to define a small-diameters portion 105 near first end 101 and a large-diameters portion 104 near second end 102.

As discussed above, when a roller 100 in the prior art had a large-diameter end, a washer 99 was inserted into the large end and welded to the inner surface of roller 100 to provide a smaller opening 98 for engaging a smaller bearing.

Figure 2:
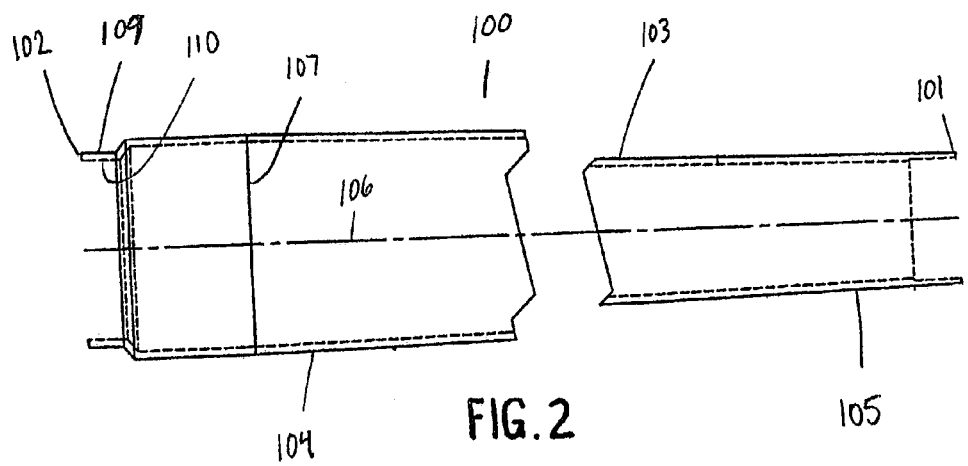
FIG. 2 is a cross-sectional view of a tapered roller in accordance with the principles of the present invention

FIG. 2 represents a tapered roller 100 in accordance with the Applicants' invention. Roller 100 is tapered from small-diameters portion 105 adjacent first end 101 to larger-diameters portion 104 near second end 102. Such taper occurs along belt-engagement length 103. Rather than inserting a washer into second end 102 to provide for connection to a bearing assembly as in the prior art, the invention contemplates providing a "necked-down" or "dropped back" portion 109 which is formed integrally with the larger-diameters portion 104 (and all other components of roller 100), that is, the necked-down portion 109 is formed from the same metal tube as every other roller component, preferably during the same operation. Such a necked-down portion 109 is adjacent second end 102 and provides a bearing mount surface 110 to allow for connection to a bearing along a wide surface rather than along the narrow inner and outer circumferences of a washer as in the prior art.

Figure 3:
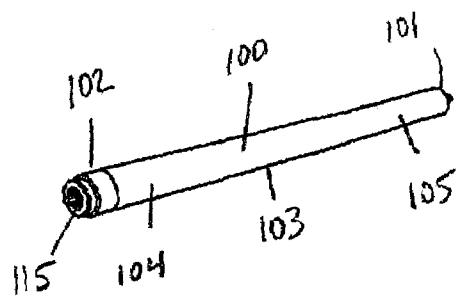
FIG. 3 is a perspective view of a tapered roller in accordance with the principles of the present invention.
Figure 4:
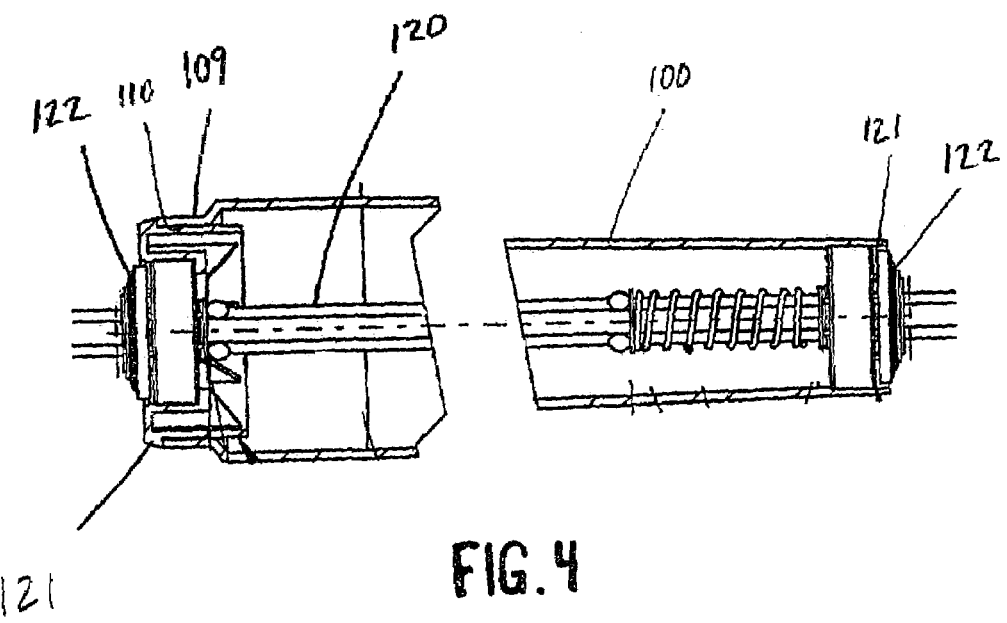
FIG. 4 is a cross-sectional view of a tapered roller rotatably mounted on an axle through support bearing assemblies in accordance with the principles of the present invention

FIG. 3 is a perspective view of the tapered roller 100 showing a bearing assembly 115 mounted to second end 102 to provide for rotatable connection to an axle. FIG. 4 is a cross-sectional view of the roller of FIG. 3. As depicted, a bearing support 121 is mounted to the bearing mount surface 110 of necked-down portion 109 (and another bearing support 121 is mounted to the internal surface of roller 100 at first end 101). Axle 120 passes through bearing supports 121 along longitudinal axis 106. A bushing 122 provides rotatable connection with respect to axle 120 and roller 100 as is known in the art.

Figure 5:
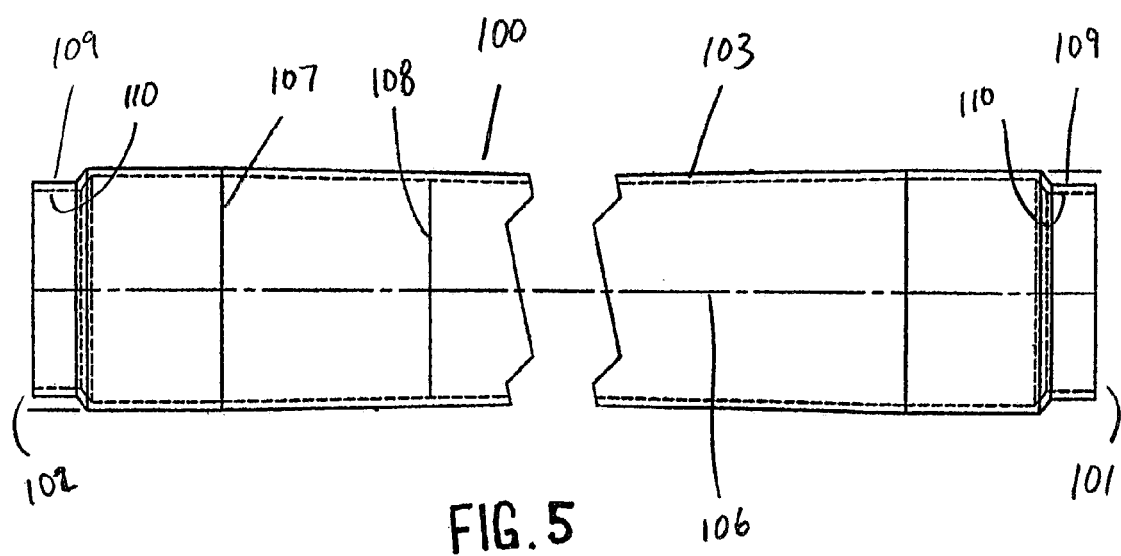
FIG. 5 is a cross-sectional view of a roller in accordance with the principles of the present invention.

FIG. 5 is similar to FIG. 2 but shows an alternate embodiment in which each end 101,102 of roller 100 has a necked-down portion 109 to provide for connection to a bearing assembly. Such a roller 100 may be of a variety of shapes including those having a straight, non-tapered belt-engagement length 103, a concave belt-engagement length 103, a convex belt-engagement length 103, a belt-engagement length 103 having concave and convex portions, or others.

Figure 6:
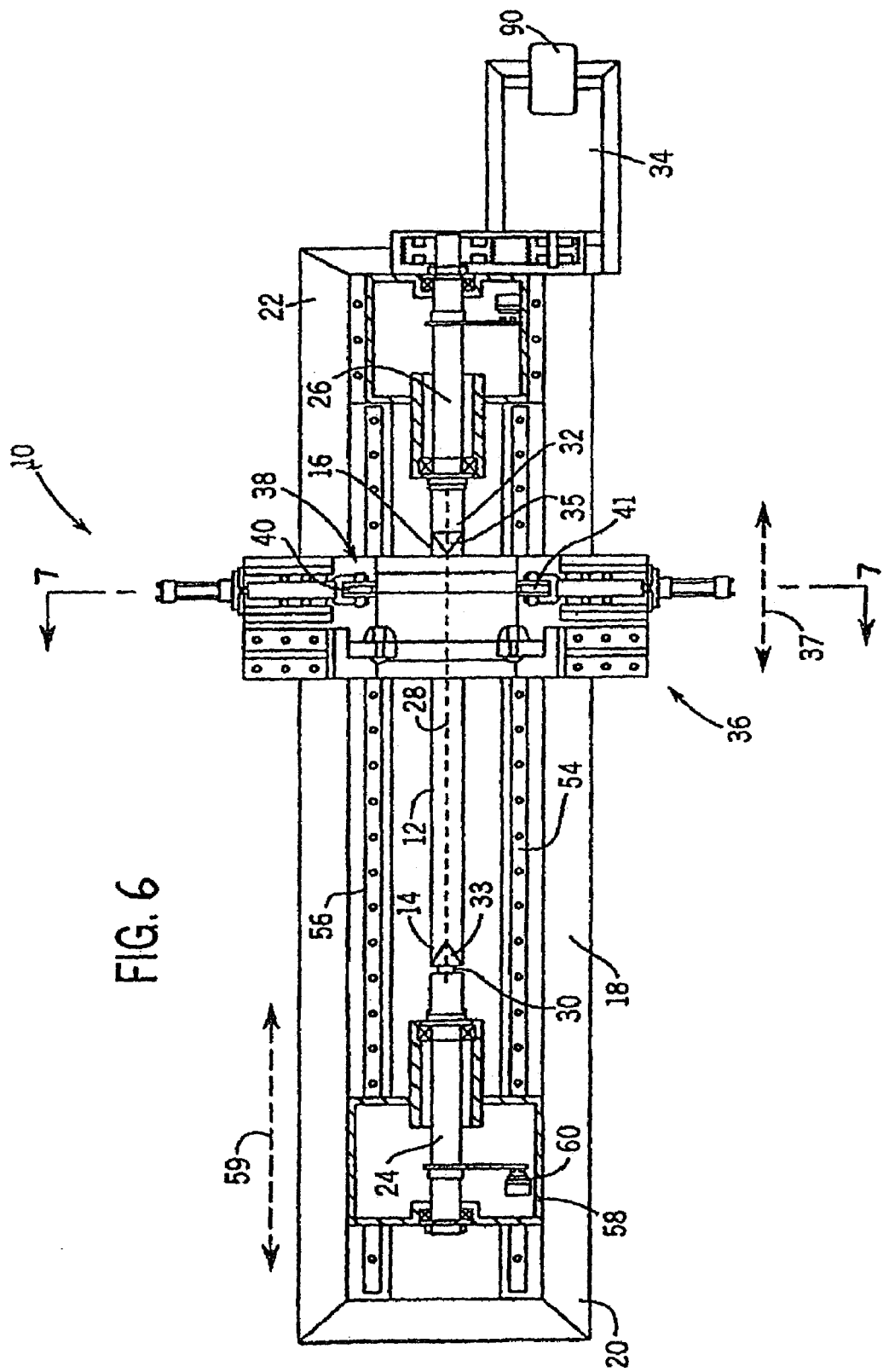
FIG. 6 is a top plan view of an apparatus for manufacturing a conveyor roller according to the present invention.

Referring to FIG. 6, an apparatus for forming rollers in accordance with the present invention is generally designated by reference numeral 10. Apparatus 10 is intended to spin-form various items, e.g., conveyor rollers, drum pulleys, web feed rollers, conveyor belt troughing pullers and the like, from a metal tube 12. As is conventional, tube 12 has an initial outer diameter; extends along a longitudinal axis; and has first and second ends 14 and 16, respectively.

Apparatus 10 includes a frame 18 having first and second extremities 20 and 22, respectively. Frame 18 further includes first and second rails 54 and 56, respectively, which are generally parallel to and spaced relative to one another, and which extend between extremities 20 and 22 of frame 18.

Tailstock 24 is rotatably secured relative to a tailstock carriage 58, as shown in FIG. 6, and tailstock carriage 58, in turn, is slidably supported on rails 54 and 56 such that tailstock 24 is slidable along frame 18 at a location adjacent first extremity 20 of frame 18. Drive mechanism 62, shown in FIG. 8, controls movement of tailstock 24 along common axis 28 (as indicated by arrow 59) in a manner hereinafter described. Tailstock 24 includes a clamp 30 for removably fastening the first end 14 of the tube 12 to the tailstock 24 and a lube pump 60 for lubrication.

Headstock 26 is mounted on frame 18 at a location adjacent to second extremity 22 of frame 18 such that headstock 26 and tailstock 24 lie on a common axis 28, illustrated by a dashed line. Headstock 26 is supported by headstock carriage 64, as shown in FIG. 8, and is operatively connected to motor 34 such that headstock 26 may be rotated about common axis 28. Headstock 24 includes a clamp 32 for removably fastening second end 16 of tube 12 to headstock 26. When supported by clamps 30 and 32 as described above, the longitudinal axis of tube 12 is coincident with axis 28.

Referring to FIG. 8, in the preferred embodiment of apparatus 10, clamps 30 and 32 are chuck devices. However, as will be appreciated by those skilled in the art, other types of clamps may be use to fasten ends 14 and 16 of tube 12 relative to tailstock 24 and headstock 26, without deviating from the scope of the present invention. Clamps 30 and 32 include conical or domed shaped end members 33 and 35, respectively.

In order to mount tube 12 onto tailstock 24 and headstock 26, ends 14 and 16 of tube 12 are aligned with corresponding end members 33 and 35, respectively. End members 33 and 35 are drawn toward each other by drive mechanism 62 such that end members 33 and 35 are inserted within corresponding ends 14 and 16, respectively, of tube 12. As a result, tube 12 is captured between end members 33 and 35 and tube 12 is firmly supported between headstock 26 and tailstock 24. As described, when mounted on tailstock 24 and headstock 26, tube 12 is free of any internal or external supports such as mandrels or the like between clamps 30 and 32. Preferably, end members 33 and 35 are of a partial egg-shaped configuration and the angles of the walls of end members 33 and 35 are within the range 45–50 degrees relative to common axis 28.

With tube 12 mounted onto tailstock 24 and headstock 26 as heretofore described, motor 34 may spin headstock 26 which, in turn, spins tube 12. As a result, tailstock 24, which is clamped to tube 12 by clamp 30, also spins at a common rotational velocity as headstock 36.

Referring back to FIG. 6, a cross slide generally designated by numeral 36 is movably supported on and guided by rails 54 and 56 to allow cross slide 36 to move in a direction parallel to the common axis 28 as indicated by the arrow 37. As best seen in FIG. 8, cross slide 36 includes means 72 for moving cross slide 36 in a direction 37 parallel to the common axis 28 such that cross slide 36 is movable along frame 18 between tailstock 24 and headstock 26.

Figure 7:
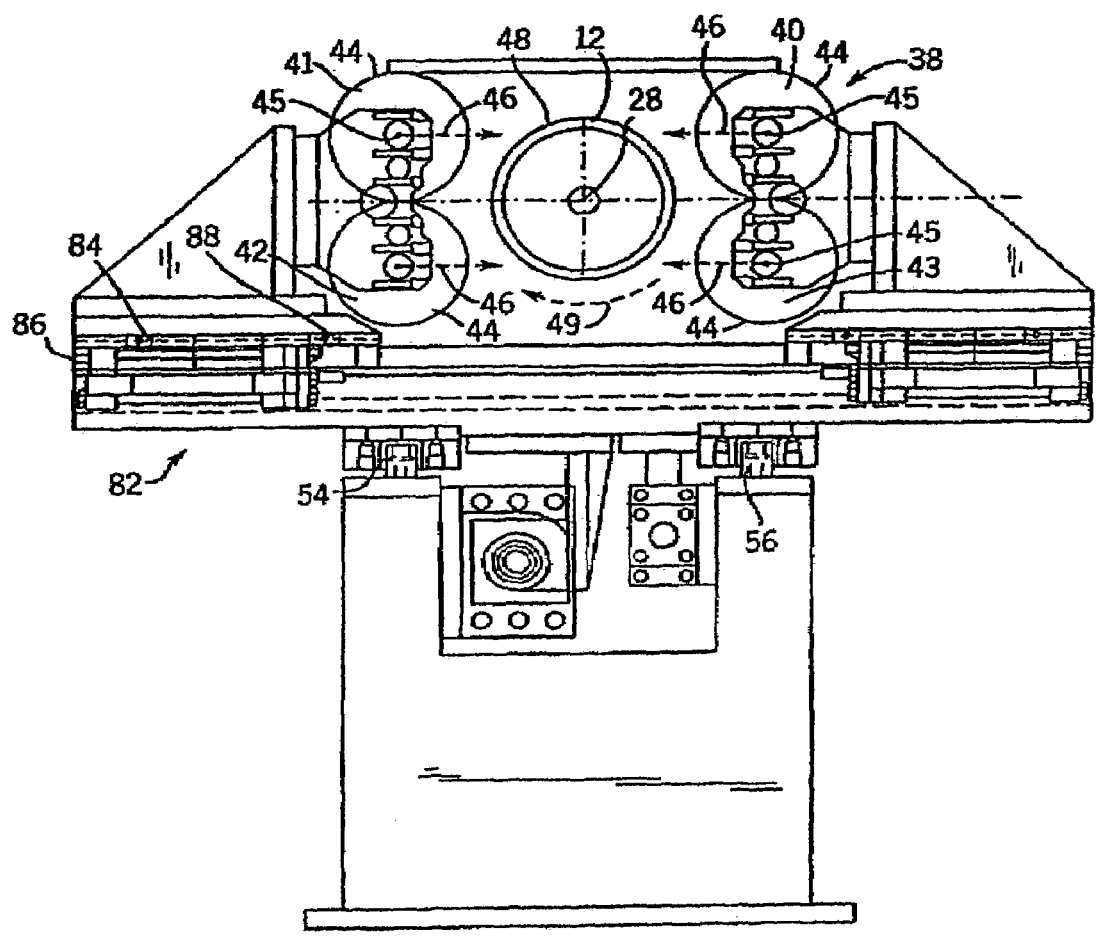
FIG. 7 is an enlarged sectional view taken along section 7-7 as indicated in FIG. 6.
Figure 10:
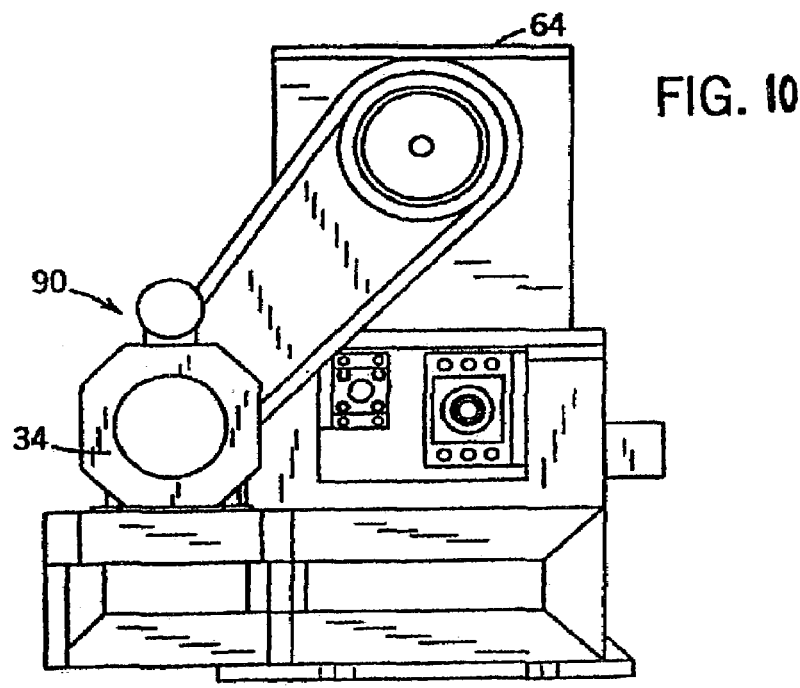
FIG. 10 is an end view of the apparatus of FIG. 7 viewed from a first side thereof.
Figure 11:
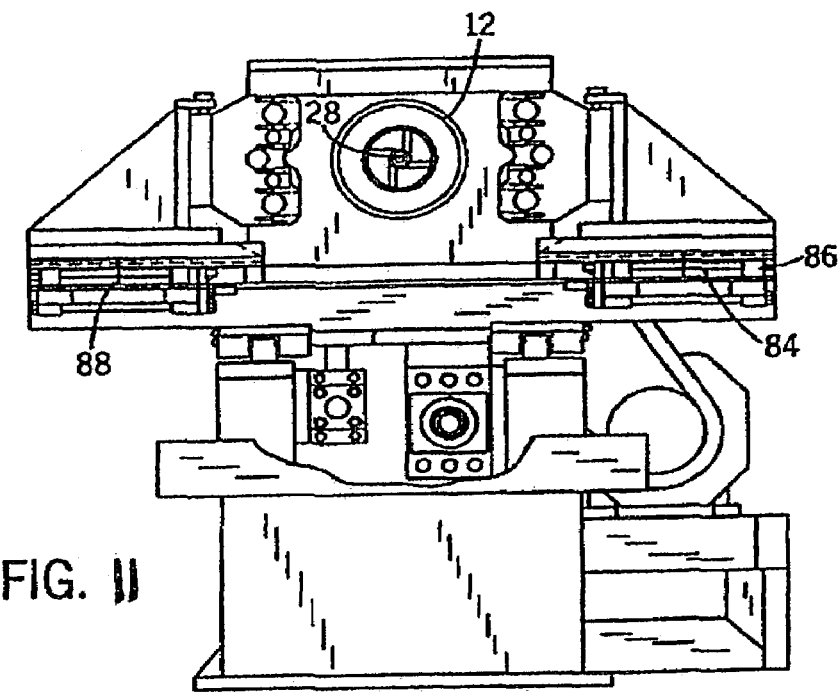
FIG. 11 is an end view of the apparatus of FIG. 7 but viewed from a second left side thereof.

A roller assembly, generally designated by the reference numeral 38, is rotatably secured to cross slide 36. As best seen in FIG. 7, roller assembly 38 includes a plurality of forming rollers 40, 41, 42 and 43, which are spaced from each other and circumferentially spaced about the outer surface 48 of tube 12. Each of the forming rollers 40–43 defines a cylindrical outer surface 44 and is rotatable about a corresponding rotational axis 45 which is generally parallel to the common axis 28. As hereinafter described, forming rollers 40–43 are movable toward and away from common axis 28. By way of example, cylindrical surface 44 of forming roller 40 is movable in a path as indicated by the arrow 46 toward the common axis 28 so that the cylindrical surface 44 may engage the outer surface 48 of tube 12.

Means 82 are provided for controllably urging each of the forming rollers 40–43 toward the common axis 28. More specifically, in a first embodiment depicted in FIG. 6, 82 includes hydraulic cylinders 84 having first and second ends 86 and 88, respectively. First ends 86 of hydraulic cylinders 84 are connected to corresponding portions of cross slide 36, while forming rollers 40–43 are rotatably connected to second ends 88 of corresponding hydraulic cylinders 84. The arrangement is such that forming rollers 40 and 43 are rotatably supported by the second end 88 of one of the hydraulic cylinders 84 while forming rollers 41 and 42 are rotatably supported on a second end 88 of the other hydraulic cylinder 84. As described, actuation of hydraulic cylinder 84 urges forming rollers 40–43 toward a common axis 28 and into engagement with outer surface 48 of tube 12.

In an alternate embodiment of apparatus 10, illustrated in FIGS. 7–11, a single hydraulic cylinder 84 is utilized such that first end 86 is operatively connected to rollers 41 and 42 through a first portion of cross slide 36 and second end 88 is operatively connected to rollers 40 and 43 through a second portion of cross slide 36. As such, by retracting second end 88 within hydraulic cylinder 84, the first and second portions of cross slide 36 are drawn toward each other such that rollers 40–43 are drawn toward common axis 28. In other words, when hydraulic fluid is drained from hydraulic cylinder 84, a piston and connecting rod which constitute the second end 88 of the cylinder 84 are moved toward first end 86 of hydraulic cylinder 84, so that the pair of rollers 40 and 43 move toward the pair of rollers 41 and 42. Although hydraulic cylinder 84 is connected to the cross slide 36, floating of the rollers 40, 43 and 41, 42 is permitted because hydraulic cylinder 84 is only guided by the cross slide 36 and is not anchored by the cross slide 36 against movement in direction 46 for modifying the outer surface 48 of tube 12.

In either embodiment of apparatus 10, the arrangement is such that when tube 12 is spun, as indicated by arrow 49 in FIG. 7, forming rollers 40–43 permit tube 12 to freely float therebetween so that when cross slide 36 moves axially, as indicated by the arrow 37, along tube 12 and forming rollers 40–43 are urged inwardly as indicated by the arrows 36 against outer surface 48 of tube 12, tube 12 is worked and controllably shaped.

As shown in FIG. 8, the apparatus 10 includes a computerized control generally designated by the numeral 90 for controlling rotation of tube 12. Such computer controls are well-known to those skilled in the art. Generally, such systems are comprised of an input device or keyboard, a memory, a processor or may be of the type described in U.S. Pat. No. 4,149,235, the disclosure of which is incorporated by reference. Control 90 also controls axial movement of cross slide 36 as indicated in the arrow 37. Furthermore, computerized control 90 also controls movement of each of the forming rollers 40–43 toward common axis 28. Control 90 aids the present invention in forming parts, tapers and grooves economically and efficiently.

Referring to FIG. 7, each of the forming rollers 40–43 is movably guided in path 46 which is normal to common axis 28 so that when the plurality of forming rollers 40–43 move in the aforementioned path 46 toward common axis 28, outer surface 48 of tube 12 is modified without requiring any internal and external support for tube 12 between the ends thereof.

As hereinafter described, tube 12 is formed by a combination of: (a) inward movement of forming rollers 40–43 toward common axis 28 as indicated by arrow 46; (b) longitudinal movement of rollers 40–43 axially between tailstock 24 and headstock 26 parallel to common axis 28 as indicated by arrow 37; and (c) rotation of tube 12 about common axis 28 as indicated by arrow 49.

In operation, tailstock 24 and headstock 26 are separated by drive mechanism 62 to allow tube 12 to be positioned therebetween along common axis 28. First end 14 and second end 16 of tube 12 are interconnected to tailstock 24 and headstock 26, respectively, as heretofore described. Motor 34 is actuated to rotate headstock 26, and hence, tube 12, about common axis 28. Forming rollers 40–43 are guided along path 46 under the control of computerized control 90 such that the outer surfaces 44 of forming rollers 40–43 engage outer surface 48 of tube 12. Thereafter, cross slide 36 moves axially, as indicated by arrow 37, between headstock 26 and tailstock 24. With forming rollers 40–43 urged against outer surface 48 of tube 12, outer surface 48 of tube 12 is controllably shaped thereby such that the outer diameter of tube 12 is altered. Given that there are no internal or external supports for tube 12 between clamps 30 and 32, it can be appreciated that the shape of outer surface 48 of tube 12 may be modified to any of the plurality of user-desired shapes.

It can be further appreciated that the length of tube 12 may increase as tube 12 is spin-formed, as heretofore described. As such, it is contemplated that tailstock 24 be permitted to move away from headstock 26 during the spin-forming operation. Such movement of tailstock 24 away from headstock 26 may be by motorized of the pressure exerted by tube 12 on tailstock 24 during the forming operation.

As described, apparatus 10 provides for spin-forming a tube 12 without requiring a supporting mandrel, internal bladder, mold, internal disks, or any supports of any kind disposed internally or externally of tube 12. This provides all of the significant advantages referred to above in facilitating formation of tapered rollers. Specifically, apparatus 10 allows for the formation of necked-down portions 109 near the ends 101,102 of rollers. Such necked-down portions 109 are formed by forcing forming rollers 40–43 toward common axis 28 near ends 101,102. Because clamps 30,32 allow connection to tube 12 only along a small diameter, necked-down portions 109 for connection to small bearing assemblies can be formed without requiring additional steps after the formation of roller 100.

The individual components need not be formed in the disclosed shapes, or assembled in the disclosed configuration, but could be provided in virtually any shape, and assembled in virtually any configuration. Furthermore, although there are many physically separate modules, it will be manifest that they may be integrated into the modules with which they are associated. Furthermore, all the disclosed features of each disclosed embodiment can be combined with, or substituted for, the disclosed features of every other disclosed embodiment except where such features are mutually exclusive.

Various modes of carrying out the invention are contemplated as being within the scope of the following claims which particularly point out and distinctly claim the subject matter regarded as the invention.

The invention claimed is:

1. A method of manufacturing from a metal tube a tapered conveyor roller, the roller having first and second ends and a belt-engagement length tapered from a smaller-diameters portion to a larger-diameters portion near the second end, the metal tube having a longitudinal axis, first and second ends, and an initial outer diameter, the method comprising:
   rotating the tube about the longitudinal axis, the tube being substantially free of internal and external supports between the ends thereof;
   providing first and second rollers which are rotatable about corresponding axes generally parallel to the longitudinal axis; and
   urging the first and second rollers against the tube and moving the first and second rollers between the first and second ends of the tube so as to alter the outer diameter of the tube to form in a single tube-shaping step both (a) the smaller- and larger-diameters portions along the belt-engagement length and (b) a necked-down portion adjacent the second end of the roller.

2. The method of claim 1 further comprising the step of securing a bearing assembly directly to the necked-down portion.

3. The method of claim 1 wherein the first and second rollers are urged against the tube with a predetermined force.

4. The method of claim 1 wherein the first and second rollers include outer surfaces free of recesses.

5. The method of claim 1 further comprising the steps of:
   providing first and second spaced clamp assemblies; and
   supporting each end of the tube with a corresponding clamp assembly.

6. The method of claim 5 further comprising the step of urging the clamp assemblies toward each other so as to capture the tube therebetween.

7. The method of claim 6 further comprising the step of allowing at least one of the clamp assemblies to move freely away from the other clamp assembly to accommodate any increase in length of the tube in response to the altering of the outer diameter of the tube.

8. The method of claim 3 further comprising the step of varying the predetermined force of the first and second rollers against the tube as the first and second rollers are moved between the first and second ends of the tube.

9. A method of manufacturing a conveyor roller, the roller having a belt-engagement length between first and second ends, from a metal tube with a longitudinal axis, first and second ends, and an initial outer diameter, comprising:
   rotating the tube about the longitudinal axis, the tube being substantially free of internal and external supports between the ends thereof;
   providing first and second rollers which are rotatable about corresponding axes generally parallel to the longitudinal axis; and
   urging the first and second rollers against the tube and moving the first and second rollers between the first and second ends of the tube so as to alter the outer diameter of the tube to form in a single tube-shaping step both (a) the belt-engagement length and (b) a necked-down portion adjacent at least one of the ends, the necked-down portion being sized to provide for connection to a support bearing assembly.

10. The method of claim 9 further comprising the step of securing a bearing assembly directly to the necked-down portion.

* * * * *